United States Patent
Goodman et al.

(10) Patent No.: US 8,750,516 B2
(45) Date of Patent: *Jun. 10, 2014

(54) REKEYING ENCRYPTION KEYS FOR REMOVABLE STORAGE MEDIA

(75) Inventors: Brian Gerard Goodman, Tucson, AZ (US); James Arthur Fisher, Tucson, AZ (US); Glen Alan Jaquette, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,648

(22) Filed: Jan. 4, 2012

(65) Prior Publication Data

US 2012/0102335 A1    Apr. 26, 2012

Related U.S. Application Data

(63) Continuation of application No. 11/470,994, filed on Sep. 7, 2006, now Pat. No. 8,130,959.

(51) Int. Cl.
*H04L 9/08* (2006.01)
*H04L 1/00* (2006.01)
*H04L 29/06* (2006.01)

(52) U.S. Cl.
USPC ........... 380/273; 380/286; 713/189; 713/165; 711/4; 726/26

(58) Field of Classification Search
USPC ............... 713/165, 189; 711/4; 380/273, 286; 726/26
See application file for complete search history.

(56) References Cited

U.S. PATENT DOCUMENTS

| | | |
|---|---|---|
| 4,688,250 A | 8/1987 | Corrington et al. |
| 5,740,061 A | 4/1998 | Dewey et al. |
| 6,023,643 A | 2/2000 | Jesionowski |
| 6,052,341 A | 4/2000 | Bingham et al. |
| 6,134,660 A | 10/2000 | Boneh et al. |
| 6,295,361 B1 | 9/2001 | Kadansky et al. |
| 6,567,914 B1 | 5/2003 | Just et al. |
| 6,725,370 B1 | 4/2004 | Sakakura |
| 6,732,277 B1 | 5/2004 | Vandergeest et al. |
| 6,915,434 B1 | 7/2005 | Kuroda et al. |
| 6,918,040 B2 | 7/2005 | Ries et al. |
| 6,950,522 B1 | 9/2005 | Mitchell et al. |

(Continued)

OTHER PUBLICATIONS

Schneier, "Applied Cryptography: Protocols, Algorithms, and Source Code in C", 1996, John Wiley & Sons, Inc., Second Edition, pp. 180-184.

(Continued)

*Primary Examiner* — Michael Simitoski
(74) *Attorney, Agent, or Firm* — Konrad Raynes Davda & Victor LLP; David W. Victor

(57) ABSTRACT

Provided are a method, system, and article of manufacture for rekeying encryption keys for removable storage media. A rekey request is received for a coupled removable storage media, wherein encryption on the coupled removable storage media uses a first key and wherein the rekey request indicates a second key. The first key and the second key are accessed in response to the rekey request. The first key is used to perform decryption for the coupled removable storage media and the second key is used to perform encryption for the coupled removable storage media.

15 Claims, 6 Drawing Sheets

(56) References Cited

U.S. PATENT DOCUMENTS

| | | |
|---|---|---|
| 7,013,389 B1 | 3/2006 | Srivastava et al. |
| 7,558,839 B1 * | 7/2009 | McGovern .................. 709/218 |
| 7,751,559 B2 | 7/2010 | Greco et al. |
| 7,752,463 B2 | 7/2010 | Hahn et al. |
| 7,757,099 B2 | 7/2010 | Greco et al. |
| 7,783,882 B2 | 8/2010 | Dawson et al. |
| 7,797,751 B1 * | 9/2010 | Hughes et al. ................. 726/26 |
| 7,817,799 B2 | 10/2010 | Greco et al. |
| 7,818,587 B2 * | 10/2010 | Drew et al. .................. 713/193 |
| 7,877,603 B2 | 1/2011 | Goodman et al. |
| 7,903,812 B2 | 3/2011 | Greco et al. |
| 7,921,294 B2 | 4/2011 | Greco et al. |
| 7,934,105 B1 * | 4/2011 | Buckingham ............... 713/193 |
| 7,934,247 B2 | 4/2011 | Greco et al. |
| 7,953,978 B2 | 5/2011 | Greco et al. |
| 7,965,844 B2 | 6/2011 | Greco et al. |
| 8,171,307 B1 * | 5/2012 | Chang ........................ 713/189 |
| 8,171,414 B2 * | 5/2012 | Hackworth .................. 715/736 |
| 2002/0126849 A1 * | 9/2002 | Howard et al. .............. 380/277 |
| 2002/0164035 A1 | 11/2002 | Yokota et al. |
| 2003/0074244 A1 * | 4/2003 | Braxton ........................ 705/7 |
| 2003/0074319 A1 * | 4/2003 | Jaquette ....................... 705/51 |
| 2003/0081787 A1 | 5/2003 | Kallahalla et al. |
| 2003/0081790 A1 | 5/2003 | Kallahalla et al. |
| 2003/0099362 A1 | 5/2003 | Rollins |
| 2004/0078568 A1 | 4/2004 | Pham et al. |
| 2004/0103292 A1 | 5/2004 | Shirouzu |
| 2005/0071591 A1 | 3/2005 | Goodman et al. |
| 2005/0086471 A1 | 4/2005 | Spencer |
| 2005/0204161 A1 | 9/2005 | Caronni |
| 2005/0207570 A1 | 9/2005 | Yamamoto et al. |
| 2005/0226423 A1 | 10/2005 | Li et al. |
| 2006/0005070 A1 * | 1/2006 | Zimmer et al. ............... 714/5 |
| 2006/0062383 A1 | 3/2006 | Kaneda et al. |
| 2006/0093150 A1 | 5/2006 | Reddy et al. |
| 2006/0179309 A1 | 8/2006 | Cross et al. |
| 2006/0248306 A1 * | 11/2006 | Suishu et al. ................ 711/170 |
| 2007/0116266 A1 | 5/2007 | Greco et al. |
| 2007/0180272 A1 | 8/2007 | Trezise et al. |
| 2007/0260891 A1 * | 11/2007 | Starr et al. .................. 713/193 |
| 2008/0065582 A1 | 3/2008 | Goodman et al. |
| 2008/0065903 A1 | 3/2008 | Goodman et al. |
| 2008/0066192 A1 | 3/2008 | Greco et al. |
| 2008/0126490 A1 * | 5/2008 | Ahlenius et al. ............. 709/206 |
| 2008/0155102 A1 * | 6/2008 | Aftelak et al. ............... 709/227 |
| 2008/0155117 A1 * | 6/2008 | Hu et al. ..................... 709/236 |
| 2008/0205635 A1 | 8/2008 | Jaquette et al. |
| 2008/0273696 A1 | 11/2008 | Greco et al. |

OTHER PUBLICATIONS

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

* cited by examiner

REKEYING ENCRYPTION KEYS FOR REMOVABLE STORAGE MEDIA

RELATED APPLICATION

This patent application is a continuation of U.S. patent application Ser. No. 11/470,994, filed on Sep. 7, 2006, which issued as U.S. Pat. No. 8,130,959 on Mar. 6, 2012, which patent application is incorporated herein by reference in its entirety.

BACKGROUND OF THE INVENTION

1. Field of the Invention

The present invention relates to a method, system, and article of manufacture for rekeying encryption for removable storage media.

2. Description of the Related Art

Data stored in removable media cartridges may be encrypted by an encryption engine to protect the data. Data encryption is especially useful for businesses that store personal data on their customers. Recent government regulations place requirements and legal obligations about companies storing personal data to report any loss of storage media containing personal information which was not encrypted.

If a user wants to change the encryption key used to encrypt data in a removable storage cartridge, then the user must initiate operations to decrypt the data in the cartridge and then re-encrypt the data using the new encryption key. The encryption keys used to encrypt and decrypt data in removable media cartridges may be maintained by a key server having a key store or database external from the storage drive.

There is a need in the art for improved techniques to provide a new encryption key to use for a data cartridge.

SUMMARY

Provided are a method, system, and article of manufacture for rekeying encryption keys for removable storage media. A rekey request is received for a coupled removable storage media, wherein encryption on the coupled removable storage media uses a first key and wherein the rekey request indicates a second key. The first key and the second key are accessed in response to the rekey request. The first key is used to perform decryption for the coupled removable storage media and the second key is used to perform encryption for the coupled removable storage media.

DETAILED DESCRIPTION

Figure 1:
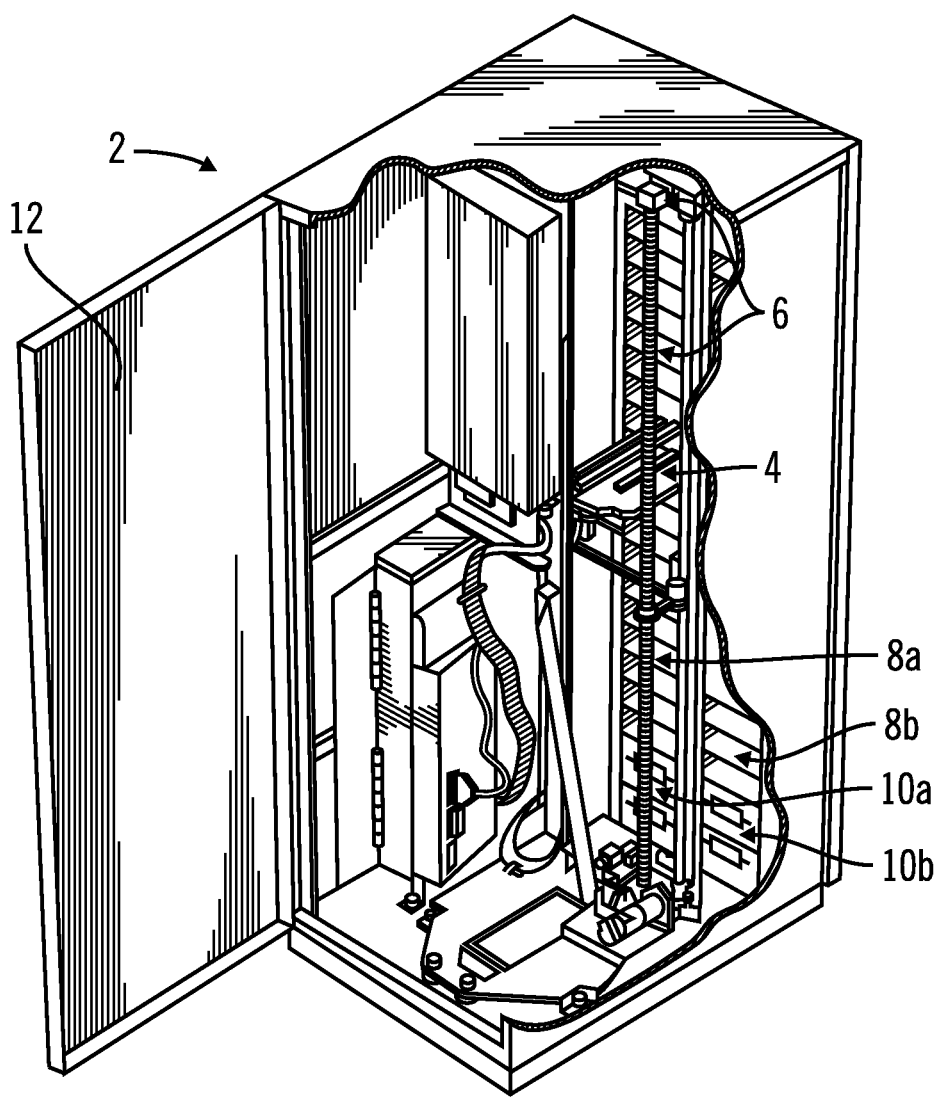
FIG. 1 illustrates an embodiment of a storage library.

FIG. 1 illustrates an automated library 2 known in the prior art. The library 2 includes a controller, an input/output station, a picker assembly 4, a carriage assembly 6, storage cells 8a, 8b, and removable media drives 10a, 10b. The term "library element" as used herein refers to any slot in the automated library 2 in which storage cartridges may be disposed, e.g., the input/output stations, the storage cells 8a, 8b, the storage drives 10a, 10b, etc. The library controller may include a processor, RAM, and other controls and interfaces to direct the actions of the library components. The controller further interacts with one or more host systems to respond to library commands transmitted from the host systems. The input/output station is an opening through which the user may insert or remove a cartridge. An operator panel on the outside of the box housing the library allows the user to communicate with the library controller. The library 2 also includes an access door 12 through which the user may add or remove cartridges maintained in the storage cells 8a, 8b.

The library 2 has two columns of storage cells 8a, 8b and storage drives 10a, 10b that perform read and/or write operations with respect to the storage cartridges. A picker assembly 4 is capable of manipulating the storage media cartridges in the library elements. A carriage assembly 6 moves the picker assembly 4, and any cartridge held by the picker assembly 4, among the library elements. The carriage assembly 6 transports the picker assembly 4 to a destination library element. The picker assembly 4 may rotate to turn the storage media cartridge over, depending on the type of removable media used. The picker assembly 4 has a finger mechanism to remove or insert a storage media cartridge to a library element. Once inserted in the storage drive 10a, 10b, data can be read from and/or written to the storage media cartridge by the library and/or a host system. There may be one or more Input/Output slots (not shown) through which a user may remove a storage media cartridge from the storage library 2 or to insert a storage media cartridge into the tape library 2 without disrupting the operation of the library.

In further embodiments, the storage library 2 may include distributed computing components, such as a distributed controller, distributed storage cells and distributed picker assemblies. Yet further, the storage library 2 may be partitioned into one or more logical libraries having one or more storage drives 2. Each storage drive 2 may be configured independently of any other drive. In addition, groups of storage drives may be configured at the same time or with the same settings. This may include all storage drives in a frame, all storage drives in a logical library, all storage drives in a physical library, or all storage drives selected from a list.

Figure 2:
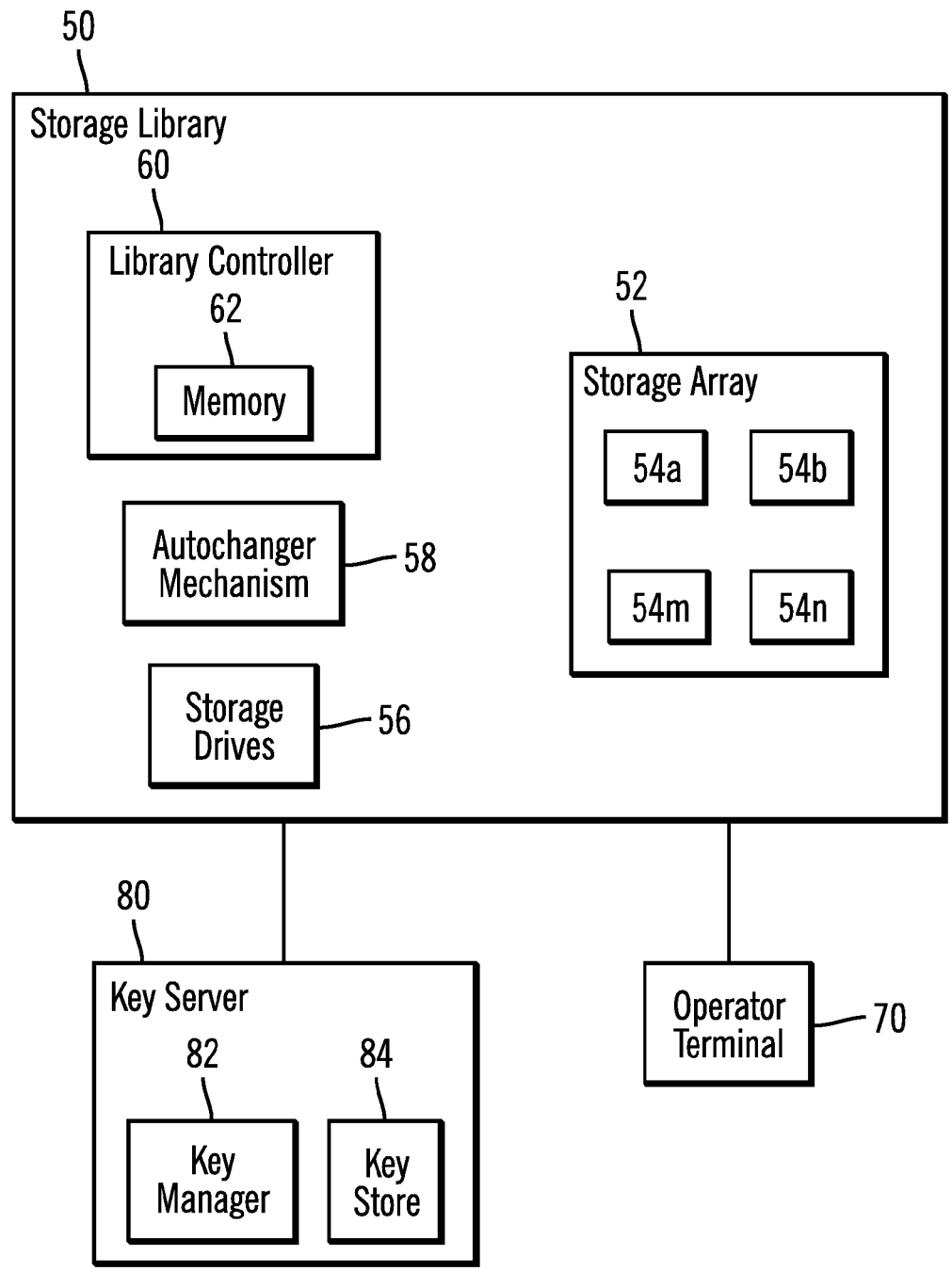
FIG. 2 illustrates an embodiment of components in a storage library.

FIG. 2 illustrates an embodiment of an automated storage library 50 including a storage array 52, such as the storage cells 8a, 8b (FIG. 1), including removable storage media 54b . . . 54n; storage drives 56, such as a tape drive, optical disk drive or other removable media storage drive to which a removable storage media is coupled for access; an autochanger mechanism 58 to transfer removable storage media 54a, 54b . . . 54n between the storage array 52 and storage drives 56, such as the picker assembly 4 (FIG. 1); and a library controller 60. An example of a library 50 is the IBM 3584 UltraScalable Tape Library.

The removable storage media 54a, 54b . . . 54n may comprise any type of media on which data may be stored and which may serve as removable media, including but not limited to magnetic media (such as magnetic tape or disks), optical media (such as optical tape or disks), holographic media (such as holographic cards, tapes, or disks), electronic media (such as PROM, EEPROM, flash PROM, MRAM, CompactFlash™, Smartmedia™, Memory Stick™, etc.), or other suitable media. In certain embodiments, the removable storage media has a cartridge housing, such as the case with a magnetic tape cartridge or optical disk cartridge.

In certain embodiments, the library controller 60 is comprised of a microprocessor and various controls and interfaces to control the operation of the components in the automated library 50, including the autochanger mechanism 58 and storage drives 56. The library controller 60 utilizes a memory 62 to store various information, such as a storage media map maintaining information on the location of removable storage media 54a, 54b . . . 54n in the library 50, including the contents of the library elements in the storage array 52. The library controller 60 may comprise a single processing unit, multiple redundant processing units, and/or multiple distributed processing units.

The library controller 60 may further manage read/write operations with respect to removable storage media 54a, 54b . . . 54n in the library 50. The library 50 is coupled to a key server 80 including a key manager 82 to perform key related operations and a key store 84. The key store 84 may comprise a database storing encryption keys that are used to encrypt data or encryption keys for removable storage media. The key store 84 may comprise a software element such as an array, structure, database, file, etc. In addition, a key store may comprise a hardware element such as memory, media, a hard drive, storage device, etc. The key server 80 may further include a user interface to enable a user to perform key management operations with respect to the key server 80, key manager 82, and/or key store 84.

A library operator may directly control operations and the management of removable storage media 54a, 54b . . . 54n through an operator terminal 70 coupled to the library 50, consisting of a display device and keyboard, to interface with the library controller 50. The operator terminal 70 may comprise a computer, workstation, personal computer, palm computer, operator panel, entry keys, a display, web user interface, proprietary user interface, or any other device or interface capable of providing a user interface for the library 50. Additionally, a host system (not shown) may send commands to the library controller 60 to control the movement of media within the automated library 50. A host system (not shown) may also send commands to storage drives 56 to perform read and/or write operations with respect to removable storage media 54a, 54b . . . 54n. The host system(s) may communicate with the library 50 and/or the storage drives 56 over one or more networks or interfaces. The host interface(s) may comprise serial, parallel, or optical interfaces such as, but without limitation, RS-232, USB (Universal Serial Bus), serial or parallel ATA (AT Attachment), SCSI (Small Computers System Interface), SAS (Serial Attached SCSI), Fibre Channel, IEEE 1394 (FireWire or Think), IEEE 1284 (parallel port), etc. In addition, the host interface(s) may comprise network or wireless interfaces such as, but without limitation, Ethernet, SAN (Storage Area Network), WAN (Wide Area Network), CAN (Controller Area Network), 802.11 (Wi-Fi), X.25 (WAN), Bluetooth, etc. Still further, the host interface(s) may comprise combinations thereof.

Figure 3:
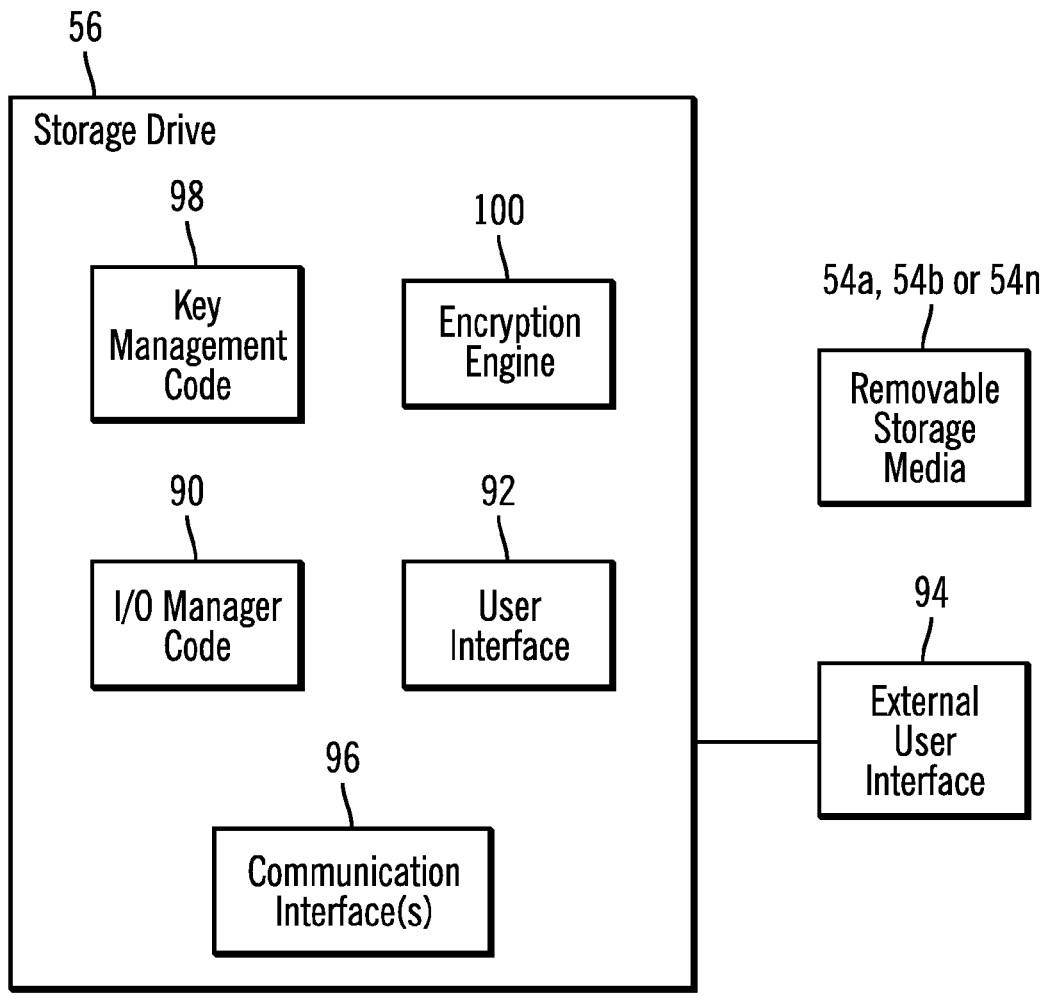
FIG. 3 illustrates an embodiment of component of a storage drive capable of interfacing with a removable storage media.

FIG. 3 illustrates an embodiment of a storage drive 56 that is capable of performing read and/or write operations with respect to a coupled removable storage media 54a, 54b . . . 54n. The storage drive 56 includes I/O manager code 90 to perform read and/or write operations with respect to a coupled removable storage media 54a, 54 . . . 54n. The storage drive 56 includes a user interface 92 comprising user controls on the storage drive 56 housing to configure and control the storage drive. Further, in certain embodiments, an external user interface 94 may optionally be coupled to the storage drive providing additional user controls that may be used to configure and/or control the storage drive 56. The storage drive 56 may further include one or more communication interfaces 96, key management code 98, and an encryption engine 100.

The user interface 92 and optional external user interface 94 may include user interface elements for interacting with the storage drive 56, such as an eject button for manually unloading removable storage media 54a, 54b . . . 54n, up/down buttons for navigating a list of items, enter/exit buttons for selecting items or exiting from a menu or list, and one or more status displays (e.g., a light or LED (Light Emitting Diode), a numeric display, alphanumeric display, etc.). The external user interface 94 may comprise a computer, workstation, personal computer, palm computer, operator panel, entry keys and a display, web user interface, proprietary user interface, or any other device or interface capable of providing a user interface for the storage drive 56.

The key management code 98 may be used to obtain one or more encryption keys from a key manager 82 that may be located at remote key server 80 to provide to the encryption engine 100 to use to encrypt and/or decrypt data with respect to the coupled removable storage media 54a, 54b . . . 54n. Alternatively, the key manager 82 may be located at the library 50 or at a host system (not shown). Herein, key, keys, encryption key, encryption keys, decryption key, and decryption keys all refer to one or more keys for the purpose of encrypting and/or decrypting data or other keys. A key may refer to an encryption key, a decryption key, a public key, a private key, a secret key, a shared key, or any other key that may be used to encrypt and/or decrypt data. In addition, a key may comprise combinations thereof. The encryption engine 100 may utilize symmetric encryption algorithms, asymmetric encryption algorithms, or combinations of symmetric and asymmetric encryption algorithms, such as but not limited to DES (Data Encryption Standard), Triple DES, AES (Advanced Encryption Standard), IDEA (International Data Encryption Algorithm), Twofish, Blowfish, Serpent, CASTS, ARC4, RSA (Rivest Shamir Adleman), Diffie-Hellman, DSS (Digital Signature Standard), etc.

In one embodiment, the key management code 98 may access an encrypted data key which as been encrypted using a key encrypting key (KEK). The encrypted data key may be stored on the coupled removable storage media 54a, 54b . . . 54n. Alternatively, the encrypted data key may be stored in a cartridge memory associated with the removable storage media 54a, 54b . . . 54n. A cartridge memory may comprise any type of wired or wireless memory or RFID tag associated with the removable storage media, as is known to those of skill in the art. An example of a removable media cartridge that contains a wireless cartridge memory is the LTO (Linear Tape Open) Ultrium tape cartridge. An example of a removable media cartridge that contains a wired cartridge memory is the Sony AIT (Advanced Intelligent Tape) cartridge. The unencrypted version of this accessed data key may be used to encrypt and/or decrypt data with respect to the coupled removable storage media 54a, 54b . . . 54n storing the encrypted data key. The key management code 98 may request the key(s) from key manager 82 so encryption engine 100 may decrypt the data key(s). The key management code 98 may then use the decrypted data key(s) to encrypt and/or decrypt data on the coupled removable storage media 54a, 54b . . . 54n. The storage drive 56 may request keys, or keys may be provided to the storage drive 56 without solicitation. For example, the library 50 may obtain keys from key manager 82 and provide them to storage drive 56 as part of a rekey request. In addition, the library 50 may act a proxy for the key manager 82. For example, the storage drive 56 may request keys from library 50 as a proxy, agent, or protocol converter for key manager 82.

The key management code 98, encryption engine 100, and I/O manager code 90 may be implemented as hardware logic in the storage drive 56 or in computer executable instructions that are accessed and executed by a processor (not shown) in the storage drive 56.

Figure 4:
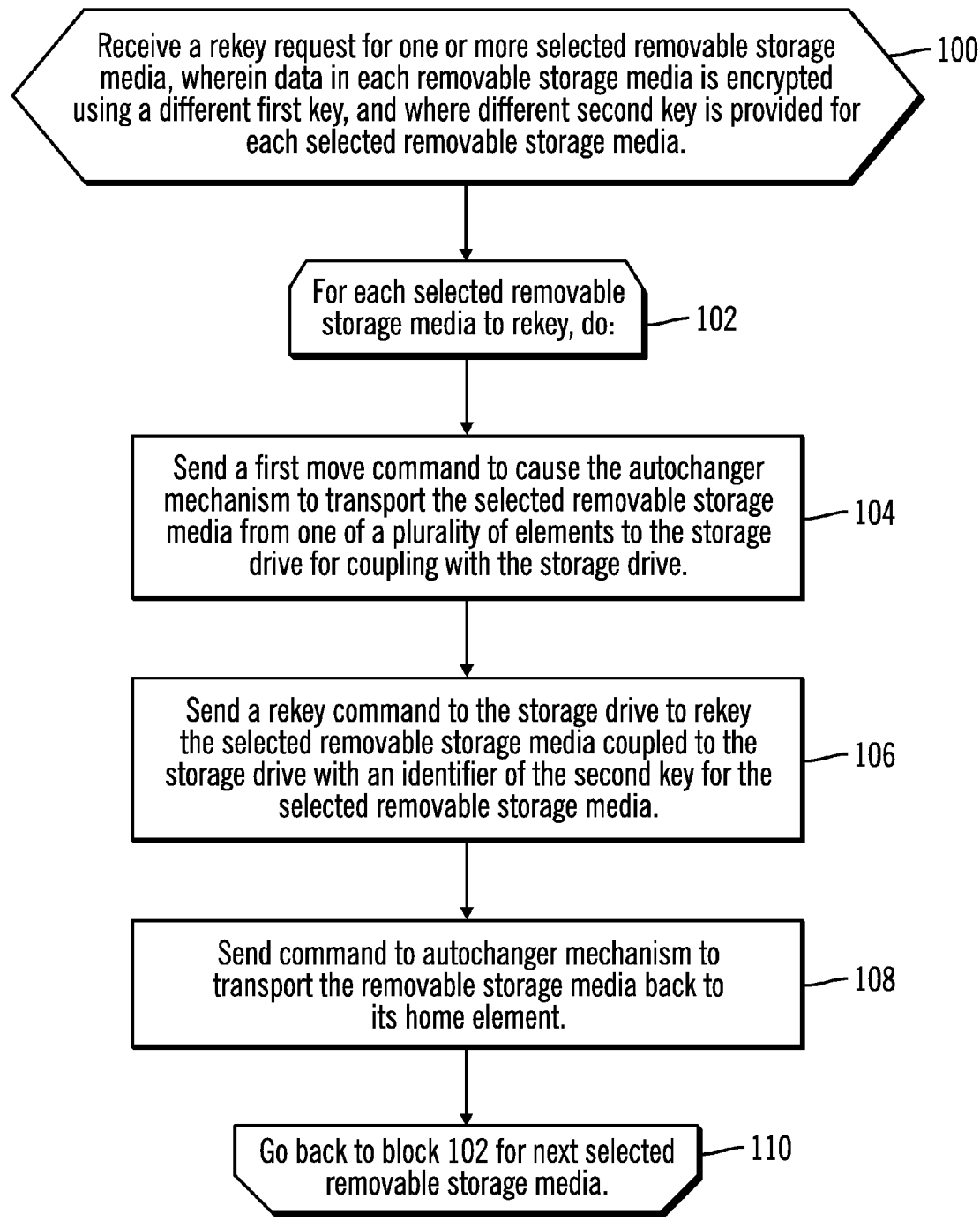
FIG. 4 illustrates an embodiment of operations to process a rekey request.

FIG. 4 illustrates an embodiment of operations performed by the storage library 50 library controller 60 to process a rekey request to change the key(s) used for one or more selected removable storage media 54a, 54b . . . 54n. A "rekey" operation refers to an operation to change the key used for a removable storage media, wherein the key to change may comprise a KEK or the actual encryption key used to encrypt the data (the data key). Upon receiving (at block 100) a rekey request for one or more selected removable storage media 54a, 54b . . . 54n, the library controller 60 performs a loop of operations at blocks 102 through 110 for each selected removable storage media. The removable storage media to rekey may be identified or selected from a user interface of the library. For example, a library user interface may comprise operator terminal 70 and media to be rekeyed may be selected from a list of media. Alternatively, the removable storage media selection may be based on a trigger. An example of a trigger may comprise a time based event. For example, media may be rekeyed on a particular date. Another example of a trigger may comprise a time interval. For example, media may be rekeyed every month. Another example of a trigger may comprise a media export operation. For example, media may be rekeyed before being exported from the library. Another example of a trigger may comprise a media access operation. For example, media may be rekeyed when the media is written. Another example of a trigger may comprise media usage. For example, media may be rekeyed after it has been accessed a certain number of times. Another example of a trigger may comprise an expired key. For example, keys may have time limits or expiration dates associated with them. Another example of a trigger may comprise a compromised key. For example, an unauthorized person or entity may obtain access to a key. Another trigger may comprise a key that has been revoked. For example, information from a Certificate Revocation List (CRL) may be used to cause a rekey operation for any media that uses or references a revoked key. Another example of a trigger may comprise a change in security protocols for the library, the key manager, or any attached host systems. For example, media may be rekeyed any time a change is made to library security settings. In another example, media may be rekeyed any time a key is removed or changed on the key manager or its associated key store. Still further, the removable storage media selection may be based on combinations thereof. Each removable storage media may be encrypted using the same or a different first encryption key and the rekey request may provide a second encryption key for each selected removable storage media, where the same or different second encryption key may be provided for each selected removable storage media. The first and second keys may comprise a KEK and/or a data key. In certain embodiments, for any particular removable storage media, there may be more than one first encryption key and there may be more than one second encryption key. For example, it may be desired to encrypt data for more than one recipient, such that more than one key can be used to decrypt the data. This allows data to be shared among several recipients without having to disclose a common secret key. In another example, there may be a first key that is used to encrypt data (a public key) and there may be another first key that is used to decrypt the same encrypted data (a secret key). This allows data to be encrypted without sharing a secret key. The use of "key" or "keys" is not meant to limit the invention to one key or multiple keys. In addition, for any particular removable storage media, there may be combinations of data keys and key encrypting keys (KEK) for the first key and/or the second key.

At block 104, the library controller 60 sends a first move command to cause the autochanger mechanism 58 to transport the selected removable storage media 54a, 54b . . . 54n from one of a plurality of elements in the library 50 to one available storage drive 56 for coupling with the storage drive 56. The library controller 60 then sends (at block 106) a rekey command to the storage drive 56 to rekey the selected removable storage media 54a, 54b . . . 54n. The rekey command is sent on a library-drive interface using proprietary protocols or standards based protocols such as the SCSI T10 ADI (Automation Drive Interface). The library-drive interface may comprise serial, parallel, or optical interfaces such as, but without limitation, RS-232, USB (Universal Serial Bus), serial or parallel ATA (AT Attachment), SCSI (Small Computers System Interface), SAS (Serial Attached SCSI), Fibre Channel, IEEE 1394 (FireWire or Think), IEEE 1284 (parallel port), etc. In addition, the library-drive interface may comprise network or wireless interfaces such, but without limitation, as Ethernet, SAN (Storage Area Network), WAN (Wide Area Network), CAN (Controller Area Network), 802.11 (Wi-Fi), X.25 (WAN), Bluetooth, etc. Still further, library-drive interface may comprise combinations thereof. The rekey command may include the first key or an identifier of the first key for the selected removable storage media 54a, 54b . . . 54n. In addition, the rekey command may include the second key or an identifier of the second encryption key for the selected removable storage media 54a, 54b . . . 54n. A key identifier is a name, alias, signature, hash, or other identifier that can be used when requesting particular keys. If the rekey operation involves changing a KEK, then a key may be rewritten to the selected removable storage media 54a, 54b . . . 54n. If the rekey operation involves changing a data key, then other data may be rewritten to the selected removable storage media 54a, 54b . . . 54n. For example, the rekey operation may comprise I/O manager code 90 reading the encrypted data from the selected removable storage media 54a, 54b . . . 54n, the encryption engine 100 decrypting the data with the first key, the encryption engine 100 encrypting the data with the second key, and the I/O manager code 90 writing the encrypted data to the selected removable storage media 54a, 54b . . . 54n. The data may comprise a key (such as an encrypted data key) and/or it may comprise other data (such as data that has been previously written to removable storage media 54a, 54b . . . 54n by a host computer or library 50). In addition, the data may be stored in a cartridge memory or it may be stored on the medium of the selected removable storage media 54a, 54b . . . 54n (such as on the tape of a tape cartridge). Herein, data written to, read from, or stored on removable storage media may refer to data in a cartridge memory or data on the storage medium of the removable storage media. In addition, data may refer to any data, including keys. The storage drive 56 may not perform the decryption and/or encryption of an encrypted data key. For example, the rekey operation may comprise I/O manager code 90 reading an encrypted data key from the selected removable storage media 54a, 54b . . . 54n, the key management code 98 sending the encrypted data key to a key manager 82, the key manager 82 decrypting the data key with the first key, the key manager 82 encrypting the data key with the second key, the key manager 82 sending the encrypted data key to key management code 98, and the I/O manager code 90 writing the encrypted data key to the selected removable storage media 54a, 54b . . . 54n. In this case, the first key and/or second key may comprise a key label or hash. For example, the key manager 82 may parse the encrypted data key to determine a label or hash for the corresponding first key. Thus, the rekey operation involves changing the key(s) for the removable storage media from the first encryption key(s) to the indicated second encryption key(s).

At block 108, the library controller 60 uses autochanger mechanism 58 to transport the removable storage media 54a, 54b . . . 54n back to its home element. The operations of FIG. 4 may be done in parallel. For example, there may be more than one storage drive 56 available for rekeying removable storage media 54a, 54b . . . 54n and the library 50 may use multiple drives to improve rekey performance.

Figure 5:
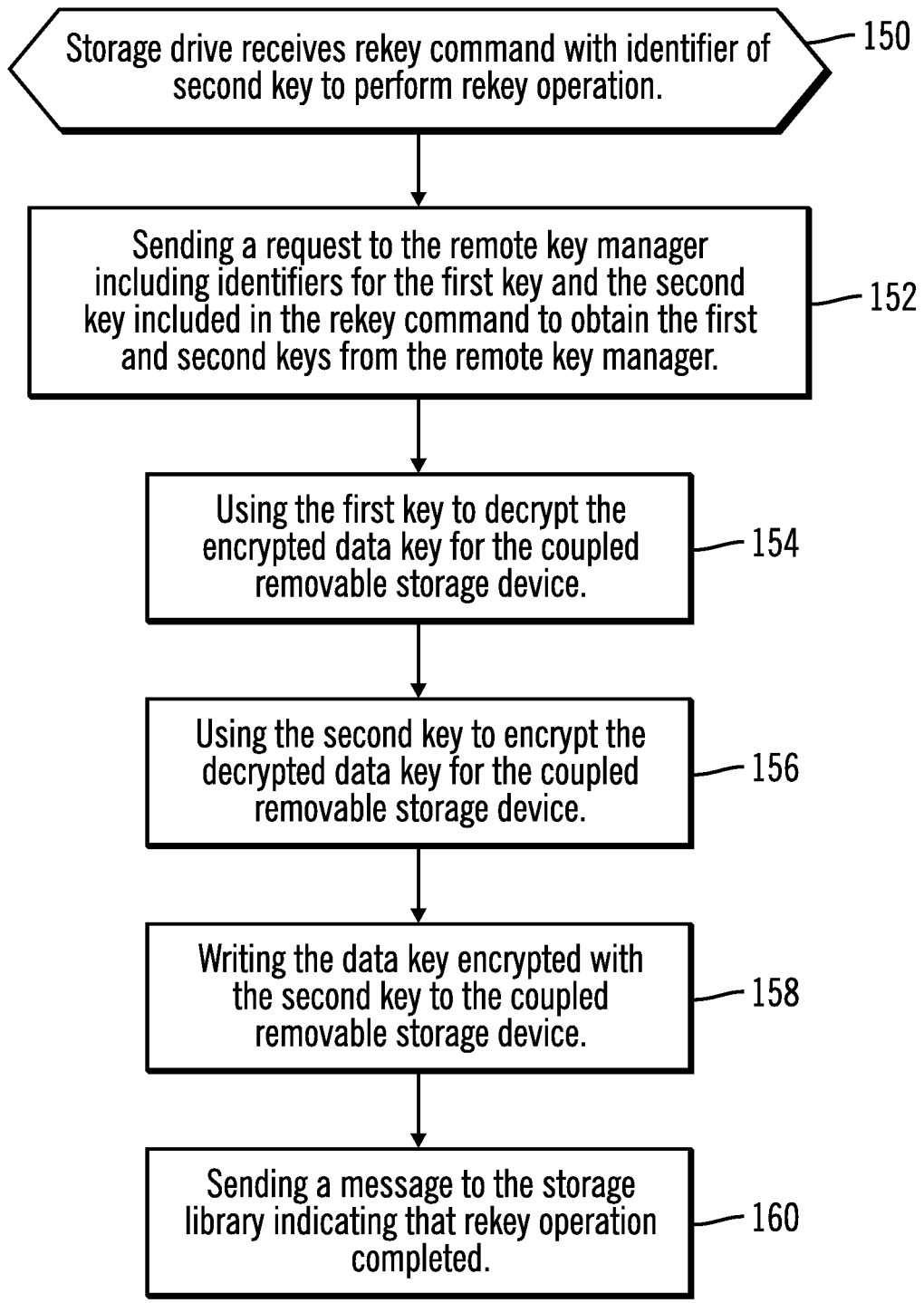
FIG. 5 illustrates an embodiment of rekey operations performed by a storage drive.

FIG. 5 illustrates an embodiment of operations performed by the storage drive 56 to process the rekey command, where the operations may be performed by the I/O manager code 90 and key management code 98 to perform operations related to accessing and using keys. The storage drive 56 (at block 150) receives the rekey command from the library controller 60. The rekey command may include the first key or an identifier of the first key and/or may include the second key or an identifier of the second key, as discussed above. The first key is used to decrypt the encrypted data key (if present) or to decrypt the data on the media. The second key is used to encrypt the data key that was decrypted with the first key, or to encrypt the data on the media that was decrypted with the first key. In the case where the library controller 60 does not provide the first and/or second key, the key management code 98 sends (at block 152) a request to the remote key manager 82 including identifiers for the first key and/or the second key. Upon receiving the requested keys, the storage drive 56 encryption engine 100 uses (at block 154) the received first key, which may comprise a KEK, to decrypt the encrypted data key for the coupled removable storage media 54a, 54b . . . 54n and uses (at block 156) the received second key to encrypt the decrypted data key for the coupled removable storage media. Alternatively, the encryption and/or decryption may be provided by the key manager 82, as discussed above. In this case, the key management code 98 would send (at block 152) the actual encrypted data key to the key manager 82 and key manager 82 would decrypt the encrypted data key with the first key, encrypt the data key with the second key, and send the encrypted data key to key management code 98. The storage drive 56 then writes (at block 158) the data key encrypted with the second key to the coupled removable storage media 54a, 54b . . . 54n. The encrypted data key may be written to the storage medium of the removable storage media, or it may be written to a cartridge memory associated with removable storage media. The storage drive 56 sends (at block 160) a message to the storage library 50 indicating that the rekey operation completed successfully. The message may be a direct message or an implied message. An example of a direct message may comprise a packet, byte, bit, status, or other identifier indicating completion status. An example of an implied message may comprise the storage drive 56 unloading or ejecting the coupled removable storage media 54a, 54b . . . 54n. The message may be sent on the library-drive interface as discussed above.

The encryption engine 100 may discard the first and/or second keys after using them to rekey the encryption key. Further, in an alternative embodiment, the storage drive 56 may provide the first and second keys to the key server 80 with the encrypted encryption key from the coupled removable storage media 54a, 54b . . . 54n, and the key server 80 may use the first and second keys to rekey the encryption key and return the encrypted encryption key to the storage drive 56 to store on the coupled removable storage media 54a, 54b . . . 54n.

Figure 6:
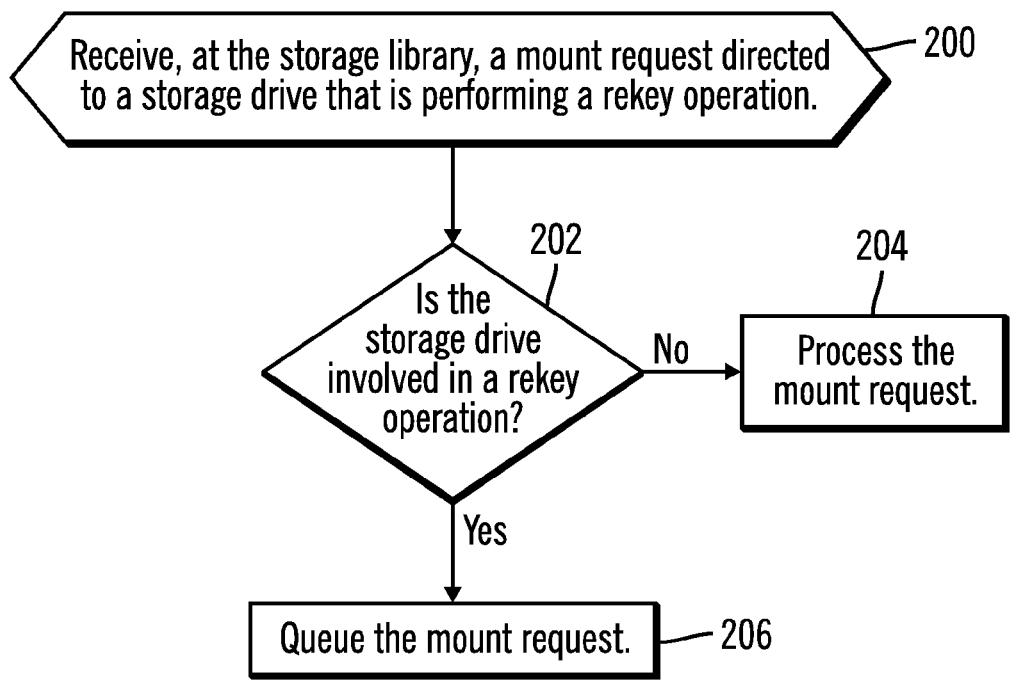
FIG. 6 illustrates an embodiment of operations to handle mount requests during a rekey operation.

FIG. 6 illustrates an embodiment of operations performed by the library controller 60 to handle mount requests directed toward the storage drive 56 in the process of performing a rekey operation. The library controller (at block 200) receives a mount request for a storage drive 56. A mount request may comprise a command to move removable storage media to a drive. The library controller 60 determines (at block 202) whether the storage drive 56 is currently involved in a rekey operation. If not, then the mount request is processed (at block 204). Otherwise, if the target removable storage media 54a, 54b . . . 54n is involved in a rekey operation, then the library controller 60 queues (at block 206) the mount request. The operations of FIG. 6 may prevent the rekey operation from being disruptive to any attached host systems because any mount requests are queued instead of being rejected by the library. In addition, the library may hide the media status of the drive to any attached host systems. For example, the library inventory may show the drive as being empty even though the drive is in the process of rekeying a removable storage media 54a, 54b . . . 54n. In fact the library may show the media involved in rekey as being in its original home element, rather than with the drive involved in a rekey process. Any host command that attempted to move that media would result in a queuing of the request until the rekey operation had completed.

In one embodiment, if the storage drive 56 involved in a rekey operation receives any commands or requests from a host system, then the storage drive 56 may return a response to the host system that the storage drive 56 is empty, i.e., is not coupled to a removable storage media. This prevents the rekey operation from being disruptive to any attached host systems.

Figure 7:
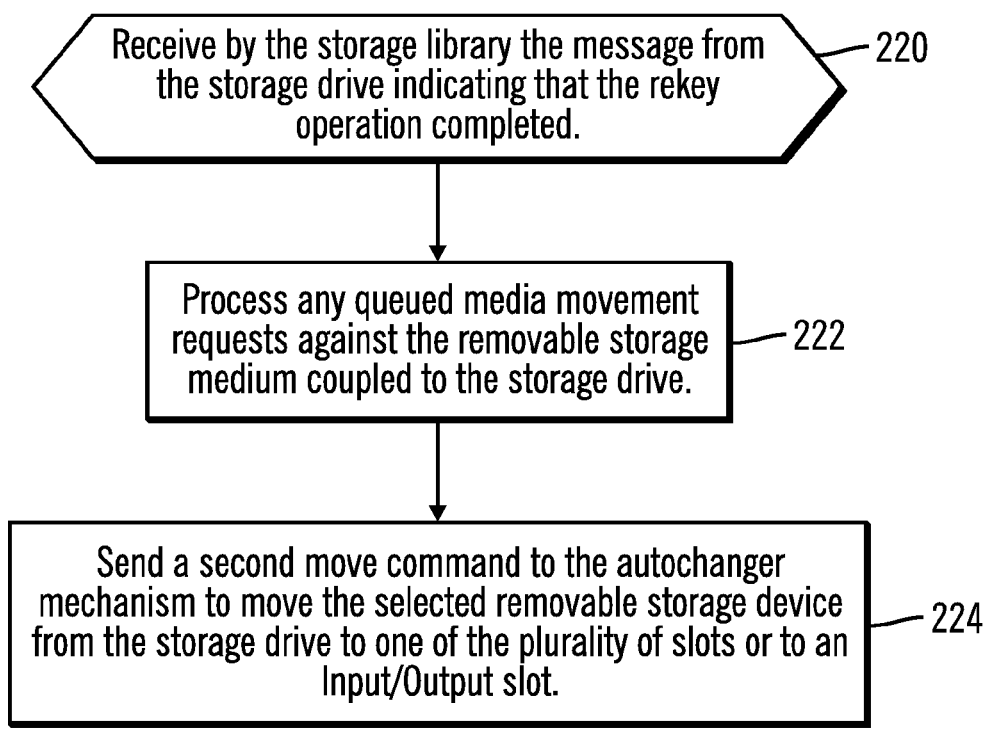
FIG. 7 illustrates an embodiment to handle completion of the rekey operation.

FIG. 7 illustrates an embodiment of operations performed by the library controller 60 upon receiving (at block 220) the message from a storage drive 56 indicating that a rekey operation completed. In response, the library controller 60 processes (at block 222) any queued media movement requests against the removable storage media 54a, 54b . . . 54n coupled to the storage drive 56 which sent the message. In addition, the library controller 60 process any queued mount requests against the storage drive 56 which sent the message. The library controller 60 may further send (at block 224) a second move command to the autochanger mechanism 58 to move the selected removable storage media 54a, 54b . . . 54n from the storage drive 56 to another element (such as the home element of the removable storage media) or to an Input/Output slot from which the removable storage media may be removed from the storage library 50 and transported to another location.

While the rekey operations have been described as being initiated by a storage library, one of skill in the art will recognize that the invention applies equally to rekey operations being initiated by a host application or a host system component. A host application may comprise, without limitation, a backup program, archival software or any other host application that manages data. An example of a host application program is the IBM Tivoli Storage Manager. A host system component may comprise, without limitation, an operating system, file system, device driver, DLL (Dynamic Link Library), etc. A host application or host system component may be coupled to an associated key manager similar to key manager 82. The key manager may be part of a key server, such as key server 80, or may be part of a host computer, a host application, or host system component.

Described embodiments provide techniques to rekey an encryption key used to encrypt and decrypt data in a removable storage media. In certain embodiments, the rekey operation may be performed by changing the KEK used to encrypt the data key without having to decrypt and re-encrypt with the data in the removable storage media with the new key. The rekey operation may be invoked by an administrator when changing the security keys as part of normal key management operations. Further, if the administrator wants to transport a tape cartridge to a third party entity, then the key provided with the rekey operation may comprise a public key used by the third party entity. In this way, the encryption key stored in the removable storage medium 54a, 54b . . . 54n sent to the third party entity is rekeyed or re-encrypted with the third part entity's public key, being used as a KEK.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the rekey command provided an identifier of a key to use in the rekeying operation. In an alternative operation, the rekey command may provide the actual new key to use in the rekey operation. Further, if the rekey command includes a label or identifier of the new key to use, then that new key may be retrieved from a remote key manager or accessed from the storage drive 56 memory, which may include a key store.

In the described embodiments, the rekey command provides a new KEK to use to encrypt the data key that is used to encrypt and decrypt data. In an alternative embodiment, the rekey command may provide a new encryption key to use. In such case, the storage drive would decrypt the data in the coupled removable storage media using the provided old data key and then re-encrypt the data with the new data key.

In the described embodiments, the rekey request was sent by the storage library 50 to the storage drive 56. In an alternative embodiment, the rekey request may be sent directly to the storage drive from a host or system other than the storage library 50.

In described embodiments, the storage drive 56 is included in a storage library 50. In an alternative embodiment, the storage drive 56 may comprise a stand-alone storage drive, such as a drive for reading removable storage media.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of rekeying removable storage media, comprising:
   communicating, by the storage drive, with an external device external to the storage drive;
   receiving, by the storage drive, from the external device, a rekey request for selected multiple coupled removable storage media, wherein encryption on the selected multiple coupled removable storage media uses a first key and wherein the rekey request indicates the first key and a second key;
   accessing, by the storage drive, the first key and the second key indicated in the rekey request in response to the rekey request;
   using, by the storage drive, the first key indicated in the rekey request to perform decryption for each of the selected multiple coupled removable storage media of the rekey request; and
   using, by the storage drive, the second key indicated in the rekey request to perform encryption for each of the selected multiple coupled removable storage media, wherein the decryption and the encryption operations are performed as part of processing the rekey request.

2. The method of claim 1, wherein the data in the selected multiple coupled removable storage media is encrypted with an encryption key, wherein the encryption key is further encrypted, wherein using the first key to perform decryption comprises decrypting the encryption key with the first key, and wherein using the second key to perform encryption comprises encrypting the encryption key with the second key.

3. The method of claim 2, wherein at least one of the selected multiple coupled removable storage media includes a cartridge memory, and wherein the encrypted encryption key is stored in the cartridge memory.

4. The method of claim 2, wherein indicating the second key in the rekey request comprises including the second key in the rekey request.

5. The method of claim 1, wherein indicating the second key in the rekey request comprises including in the rekey request an identifier of the second key, further comprising:
   sending a request for the first key to a remote key manager; and
   sending a request to the remote key manager including the identifier of the second key for the second key, wherein the first and second keys are accessed from the remote key manager.

6. A system of rekeying removable storage media in communication with an external device, comprising:
   a storage drive having at least one of hardware logic and a computer readable storage device having code comprising:
      I/O manager code enabled to communicate with the external device and receive a rekey request from the external device for selected multiple coupled removable storage media, wherein encryption on the selected multiple coupled removable storage media uses a first key and wherein the rekey request indicates the first key and a second key;
      key management code enabled to cause operations to be performed, the operations comprising:
         accessing the first key and the second key indicated in the rekey request in response to the rekey request;
         using the first key indicated in the rekey request to perform decryption for each of the selected multiple coupled removable storage media of the rekey request; and
         using the second key indicated in the rekey request to perform encryption for each of the selected multiple coupled removable media, wherein the decryption and the encryption operations are performed to process the rekey request.

7. The system of claim 6, wherein the data in the selected multiple coupled removable storage media is encrypted with an encryption key, wherein the encryption key is further encrypted, wherein using the first key to perform decryption comprises decrypting the encryption key with the first key, and wherein using the second key to perform encryption comprises encrypting the encryption key with the second key.

8. The system of claim 7, wherein at least one of the selected multiple coupled removable storage media includes a cartridge memory, and wherein the encrypted encryption key is stored in the cartridge memory.

9. The system of claim 7, wherein indicating the second key in the rekey request comprises including the second key in the rekey request.

10. The system of claim 6, in communication with a remote key manager, wherein indicating the second key in the rekey request comprises including in the rekey request an identifier of the second key, wherein the key management code is further enabled to perform operations comprising:
    sending a request for the first key to the remote key manager; and
    sending a request to the remote key manager including the identifier of the second key for the second key, wherein the first and second keys are accessed from the remote key manager.

11. An article of manufacture comprising at least one of hardware logic and a computer readable storage device including code, implemented in a storage drive in communication with an external device external to the storage drive, executed to perform operations with respect to a removable storage media, the operations of the storage drive comprising:
    communicating with the external device;
    receiving a rekey request for selected multiple coupled removable storage media, wherein encryption on the coupled removable storage media uses a first key and wherein the rekey request indicates the first key and a second key;

causing an accessing of the first key and the second key indicated in the rekey request in response to the rekey request;

causing a using of the first key indicated in the rekey request to perform decryption for each of the selected multiple coupled removable storage media indicated in the rekey request; and causing a using of the second key indicated in the rekey request to perform encryption for each of the selected multiple coupled removable storage media indicated in the rekey request, wherein the decryption and the encryption operations are performed to process the rekey request.

12. The article of manufacture of claim 11, wherein the data in the selected multiple coupled removable storage media is encrypted with an encryption key, wherein the encryption key is further encrypted, wherein using the first key to perform decryption comprises decrypting the encryption key with the first key, and wherein using the second key to perform encryption comprises encrypting the encryption key with the second key.

13. The article of manufacture of claim 12, wherein at least one of the selected coupled removable storage media includes a cartridge memory, and wherein the encrypted encryption key is stored in the cartridge memory.

14. The article of manufacture of claim 12, wherein indicating the second key in the rekey request comprises including the second key in the rekey request.

15. The article of manufacture of claim 11, wherein indicating the second key in the rekey request comprises including in the rekey request includes an identifier of the second key, the operations further comprise:

sending a request for the first key to a remote key manager; and sending a request to the remote key manager including the identifier of the second key for the second key, wherein the first and second keys are accessed from the remote key manager.

\* \* \* \* \*